US012326902B2

(12) United States Patent
Russinovich et al.

(10) Patent No.: US 12,326,902 B2
(45) Date of Patent: Jun. 10, 2025

(54) STANDING QUERY TO REACTIVE DATABASE

(71) Applicant: Microsoft Technology Licensing, LLC, Redmond, WA (US)

(72) Inventors: Mark Eugene Russinovich, Bellevue, WA (US); Dharma K. Shukla, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

(21) Appl. No.: 17/447,230

(22) Filed: Sep. 9, 2021

(65) Prior Publication Data

US 2023/0073887 A1  Mar. 9, 2023

(51) Int. Cl.
    *G06F 16/9032*     (2019.01)
(52) U.S. Cl.
    CPC ................ *G06F 16/9032* (2019.01)
(58) Field of Classification Search
    CPC ............ G06F 16/9032; G06F 16/90335
    See application file for complete search history.

(56) References Cited

U.S. PATENT DOCUMENTS

| 8,185,909 | B2  | 5/2012  | Sigal et al. |
| 9,270,546 | B2  | 2/2016  | Lehmann et al. |
| 10,061,823 | B2 | 8/2018  | Bruce et al. |
| 2008/0162532 | A1* | 7/2008 | Daga ................. G06F 16/248 707/999.102 |
| 2012/0284255 | A1* | 11/2012 | Schechter ........... G06F 16/2471 707/718 |
| 2018/0329958 | A1* | 11/2018 | Choudhury ......... G06F 16/2456 |
| 2019/0258734 | A1* | 8/2019  | Chkodrov .......... G06F 16/2443 |
| 2020/0019638 | A1  | 1/2020  | Dilova et al. |
| 2020/0334234 | A1* | 10/2020 | Mendel-Gleason ........ G06F 16/9024 |
| 2020/0349151 | A1  | 11/2020 | Bourne et al. |

(Continued)

OTHER PUBLICATIONS

Tracy Lord, Retrievals from DB2 BLOB (Binary Large Objects) Data Warehouse Using Sas®IBM, SAS Institute, Proc. of NESUG Conference, 2000 (Year: 2000).*

(Continued)

*Primary Examiner* — Taelor Kim
(74) *Attorney, Agent, or Firm* — Alleman Hall & Tuttle LLP

(57) ABSTRACT

A computing system is provided, including non-volatile storage storing a reactive database including a plurality of database entities. The computing system may further include a processor configured to, via a reactive database application program interface (API), receive a first standing query registration input including a first standing query. The first standing query may include a first update condition and may be associated with a first database entity. The processor may be further configured to store the first standing query in the non-volatile storage. The processor may be further configured to write data to the reactive database and determine that the first update condition is satisfied by the written data. In response to determining that the first update condition is satisfied, the processor may be further configured to execute the first standing query to perform a first state change at the first database entity of the plurality of database entities.

10 Claims, 13 Drawing Sheets

(56) References Cited

U.S. PATENT DOCUMENTS

2021/0019316 A1  1/2021  Pang

OTHER PUBLICATIONS

Leandro Galrinho et al., "ReGraDa: Reactive Graph Data", Jun. 8, 2021, v. 12717, pp. 187-220 (Year: 2021).*

"R2DBC (Reactive Relational Database Connectivity)", Retrieved From: https://web.archive.org/web/20210319084148/ https:/r2dbc.io/, Mar. 19, 2021, 3 Pages.

Alberton, Lorenzo, "Storing Graphs in the Database: SQL Meets Social Network", Retrieved From: https://inviqa.com/blog/storing-graphs-database-sql-meets-social-network, Sep. 7, 2009, 21 Pages.

Chen, et al., "Autonomic Provisioning of Backend Databases in Dynamic Content Web Servers", In Proceedings of EEE International Conference on Autonomic Computing, Jun. 12, 2006, pp. 231-242.

Shang, et al., "CrocodileDB: Efficient Database Execution through Intelligent Deferment", In Proceedings of 10th Annual Conference on Innovative Data Systems Research, Jan. 12, 2020, 8 Pages.

Bou, et al., "An Improved Method of Keyword Search over Relational Data Streams by Aggressive Candidate Network Consolidation", In Proceedings of 27th International Conference on Database and Expert Systems Applications, Sep. 5, 2016, pp. 336-351.

Hedgpeth, Robert, "R2DBC Revealed Reactive Relational Database Connectivity for Java and JVM Programmers", Published by Apress, Apr. 2, 2021, 220 Pages.

"International Search Report and Written Opinion Issued in PCT Application No. PCT/US22/036614", Mailed Date: Nov. 18, 2022, 15 Pages.

Zhu, et al., "HDAG-Explorer: A System for Hierarchical DAG Summarization and Exploration", In Proceedings of the VLDB Endowment, vol. 13, Issue 12, Aug. 1, 2020, pp. 2973-2976.

* cited by examiner

STANDING QUERY TO REACTIVE DATABASE

BACKGROUND

In typical database systems, queries to a stored database are configured to be received from processes external to the database system. Query responses are output to the processes from which the queries were received. For example, a database client can monitor a database entry to determine whether it has reached a certain value by polling a database server, through repeated queries sent across a computer network to the database server according to a polling schedule. The database client will receive responses to the queries which contain query results, and these responses also traverse the computer network. To take an action in response to the query result, the database client can then send another database query requesting an action be taken and again receive a query response, requiring another roundtrip communication over the computer network. Such database polling communications can consume significant bandwidth, particularly when the frequency of polling is high. Further, communications across the network between the database server and client are subject to latency, which can be unpredictable on a public network. Also, both server and client processor and memory resources are consumed by processing the polling requests and responses. Too many such requests can result in a condition known as server throttling, in which the processor of the server becomes bogged down simply acknowledging incoming requests, and becomes unable to devote resources to fulfilling the requests. This phenomenon can result in the query not being serviced.

The following example scenario illustrates the deleterious effects associated with such database polling in large scale databases with real time inputs from edge computing devices. Consider a temperature monitoring database system designed to receive temperature value inputs from hundreds or thousands of temperature sensors situated in rooms of a building, at predefined intervals. The temperature values may be stored in a database of temperature data. The temperature data may, for example, be used by a controller equipped with a database client to control a heating, ventilation, and air conditioning (HVAC) system of the building based on temperature values read from the database. However, for the database client to poll the database at the predefined time interval may require performing large numbers of queries that consume large amounts of memory and processing capabilities, as well as that consume bandwidth and are subject to latency. In addition, when it is desirable for the computing device that performs the queries to respond quickly to urgent events (e.g., send a notification indicating fire in the building after detecting a temperature value in the database that exceeds a predetermined threshold), a high polling frequency can be required, further compounding the drawbacks discussed above.

SUMMARY

To address these issues, according to one aspect of the present disclosure, a computing system is provided, including non-volatile storage storing a reactive database including a plurality of database entities. The computing system may further include a processor configured to, via a reactive database application program interface (API), receive a first standing query registration input including a first standing query. The first standing query may include a first update condition and may be associated with a first database entity of the plurality of database entities. The processor may be further configured to store the first standing query in the non-volatile storage. The processor may be further configured to write data to the reactive database. The processor may be further configured to determine that the first update condition is satisfied by the written data. In response to determining that the first update condition is satisfied, the processor may be further configured to execute the first standing query to perform a first state change at the first database entity of the plurality of database entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
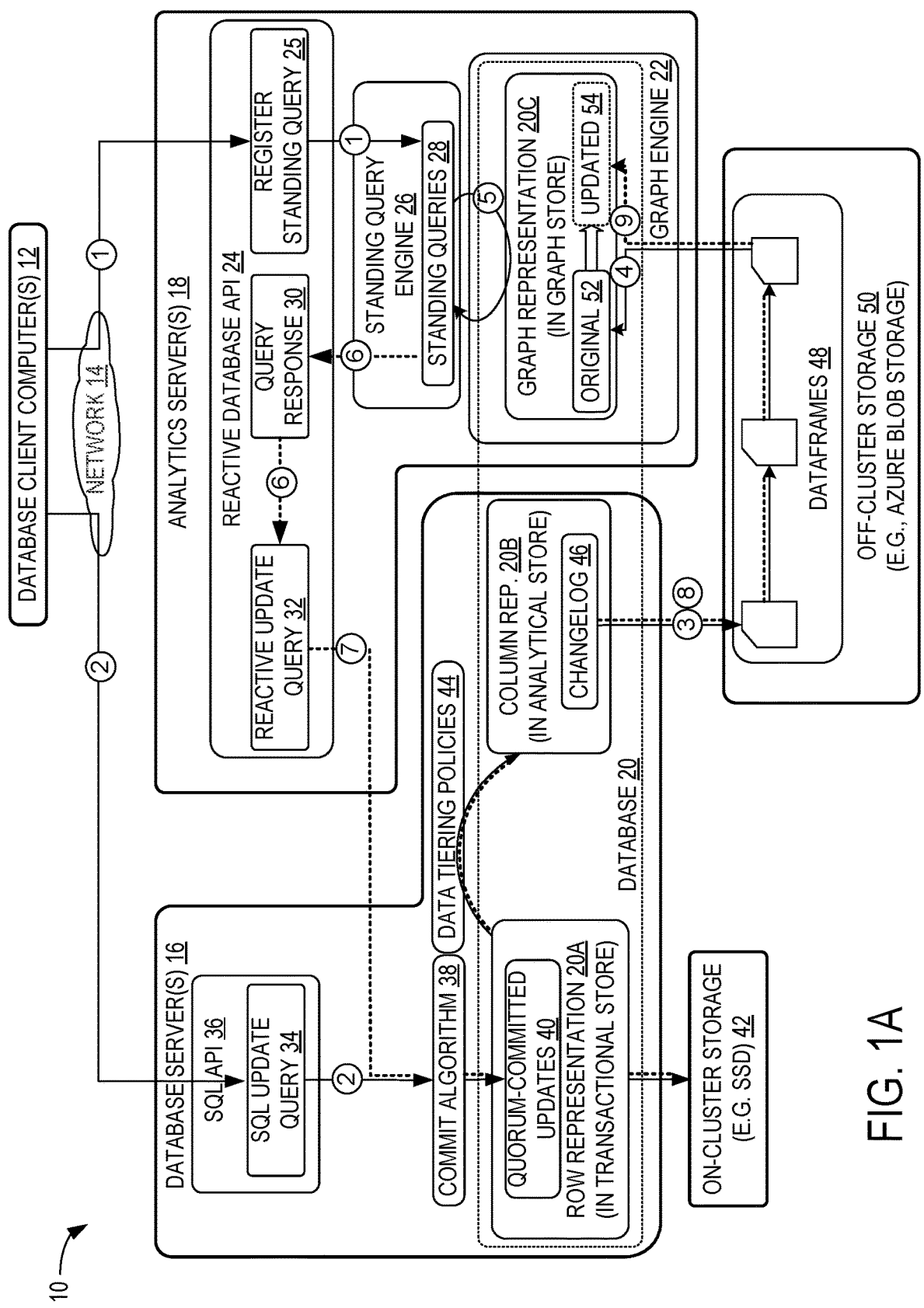
FIG. 1A schematically illustrates a configuration of a distributed database computing system, according to one example embodiment.
Figure 1B:
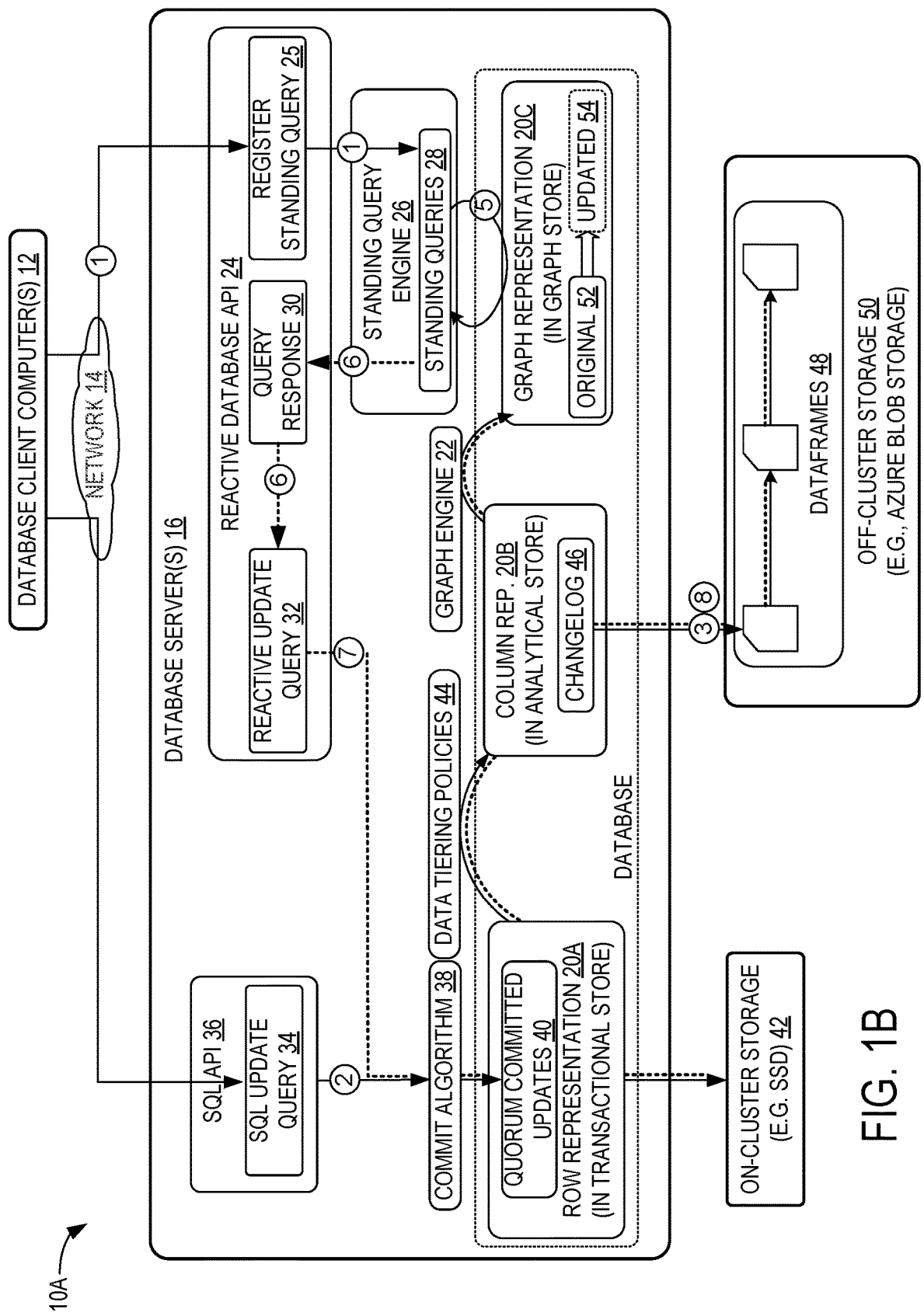
FIG. 1B schematically illustrates another configuration of a distributed database computing system, according to another example embodiment.

In order to address the challenges discussed above, a distributed database computing system 10 is provided, as depicted schematically according to the examples of FIGS. 1A and 1B. Referring initially to FIG. 1A, distributed database computing system 10 includes a database client computer 12 configured to communicate via a computer network 14 such as the Internet with one or more servers, including database servers 16 and analytics servers 18, to perform queries on a database 20. Database 20 may include a plurality of representations, including a row representation 20A stored in a transactional store, a column representation 20B stored in an analytical store, and a graph representation 20C stored in a graph store. At scale and when configured appropriately, the row representation 20A can offer performance advantages in writing data quickly, the column representation 20B can offer performance advantages in storing data more efficiently for analytics programs to process, and the graph representation 20C can offer performance advantages of low latency traversal for superior query response times, enabling near real time analytics of large data sets.

In the embodiment of FIG. 1A, the row representation 20A in the transactional store and column representation 20B in the analytical store are generated and stored by database servers 16, while the graph representation 20C in the graph store is generated and stored by a graph engine 22 executed by analytics servers 18. In this configuration, the graph engine 22 is configured to read out dataframes 48 containing compressed column representations 20B of the database 20 and to construct the graph representation 20C therefrom. An alternative configuration is illustrated in FIG. 1B, in which the database servers 16 execute the graph engine 22, and the graph engine 22 is configured to generate the graph representation 20C directly from the column representation 20B of the database in the analytical store, or in yet an alternative configuration directly from the row representation 20A in the transactional store.

Continuing with FIG. 1A, analytics servers 18 are configured to execute a reactive database application programming interface (API) 24 including a register standing queries module 25 configured to register standing queries 28 with standing query engine 26, upon request from a user of database client computer 12. Standing query engine 26 is configured to execute the standing queries 28 programmatically, for example, in response to change in a graph representation 20C of the database 20. One suitable analytics platform that may be utilized as analytics servers 18 is the AZURE SYNAPSE analytics framework of MICROSOFT® Corporation. The standing queries 28 include predefined trigger conditions such as a state of one or more nodes or vertices in the graph representation 20C of the database 20, and one or more associated actions to be taken in response to the trigger conditions being satisfied. Thus, the database 20 is a reactive database. Typically, the associated actions include a query response 30 that instructs the reactive database API 24 to send one or more reactive update queries 30 to the database server 16 hosting the row representation 20A of the database 20. As discussed below, this architecture enables the distributed database computing system 10 itself to programmatically update the state of database 20, without receiving an explicit query from the database client computer 12 requesting that the update be performed. A technical benefit of such an approach is that for applications that conventionally have required frequent database polling, such as an emergency fire monitoring system querying the temperature of a large number of temperature sensors in a building as discussed above, frequent polling from the client to the server can be avoided and replaced with server-side standing queries, saving network bandwidth and reducing latency for the database update.

Circles (1) through (9) illustrate an example process flow of setting up and implementing a standing query 28 using the distributed database computing system 10 of FIG. 1A. As shown at (1), a user of database client computer 12 may register a standing query 28 via the reactive database API 24, for execution by the standing query engine 26. At (2), the same or another database client computer 12 may send a SQL update query 34 via the SQL API 36 of the database server 16. The SQL update query 34 is processed by a commit algorithm 38 configured to determine whether a quorum of software agents within the database server 16 authorize the update. Once approved by a quorum of such software agents, quorum-committed updates 40 are written to the transactional store in row representation 20A. This transactional store may be stored in on-cluster storage 42, such as a solid state drive (SSD) or hard disk of the server executing the database server 16 instance processing the SQL update query 34. It will be appreciated that multiple instances of the database server 16 are typically instantiated and collectively operate to maintain the database 20, and one or more datasets may be stored on-cluster at each compute node of each database server instance. In one example, a globally distributed, horizontally partitioned, multi-modal database service such as MICROSOFT® AZURE COSMOS DB may be used as the database servers 16. Other database server architectures may also be used.

It will be appreciated that row representation 20A is a relational representation of the database 20 and is optimized for write performance. To optimize the database 20 for efficient storage and analytics processing, the database server 16 may also be configured to execute one or more data tiering policies 44, which are used to tier data by desired retrieval latency, or according to another factor. Each tier of data can be stored using an appropriate form of storage, such as hot storage, cool storage, or cold storage, which are storage levels with increasingly long guaranteed retrieval times.

As shown at (3), a changelog 46 of the tiered data is stored in an analytical store in column representation 20B, in compressed form. Dataframes 48 storing the compressed column representation 20B, append-only redo logs, and invalidation bitmaps are stored in this compressed format on off-cluster storage 50. The off-cluster storage 50 in one example may be MICROSOFT AZURE binary large object (BLOB) storage, configured with containers designed to hold dataframes 48. Of course, alternative storage formats may be utilized.

As shown at (4), following storage, these dataframes 48 are read out by graph engine 22, such as APACHE SPARK GraphX, which reconstructs an original state 52 of the graph representation 20C of the compressed column representation 20B of the database 20 stored in the off-cluster storage 50. As shown at (5), with each change in the graph representation 20C, the standing queries 28 are run to see if any trigger conditions are met.

If a trigger condition is met, then as shown at (6), a query response 30 is sent to the reactive database API 24, instructing the reactive database API 24 to make the reactive update queries 32 associated with that trigger condition in the triggered standing query 28. The process flow from the query response at (6) to the updating of the graph representation at (9) is illustrated in dashed lines in FIG. 1A, to visually indicate the internal loop involved in a reactive update to the database 20 based upon the standing query 28. It will be appreciated that this update is transactional because it occurs via an update query sent to the database server 16, i.e., a request to update the transactional store.

Next, as shown at (7), in response to receipt of the query response 30, the reactive update query 32 is sent from the analytics server 18 to the database server 16. Importantly, this occurs without any query being sent from the database client computer 12 for the purpose of causing the reactive update query 32 to be executed. Rather, the reactive update query 32 is generated server side, by the reactive database API 24 and standing query engine 26 operating together as described. The reactive update query 32 is received and handled by the commit algorithm 38, and if successful, results in a quorum-committed update 40 being performed on the row representation 20A in the transactional store. This quorum-committed update 40 in turn is reflected in the changelog 46 of the analytical store following data tiering and saved in the column representation 20B (column compressed format) at (8) in off-cluster storage. Once the dataframe 48 containing the update made in response to the reactive update query 32 is read out by the graph engine 22, as shown at (9), the graph engine 22 modifies the graph representation 20C of the database 20 from the original state 52 to an updated state 54 containing the changes requested by the reactive update query 32. These changes may include changes to the structure or properties of the database 20 itself, which are reflected as changes in the values and/or arrangement of nodes and vertices in the graph representation 20C. The process of automatically updating the database 20 based on the standing queries 20 can continue for so long as the standing queries 28 are registered, thereby compounding the savings in bandwidth, latency, processor usage, and memory usage discussed above, as compared to prior approaches that utilized polling database queries.

Building on the illustrative example regarding temperature monitoring discussed above, a standing query may be registered to change the status of a status node in the database from "normal" to "emergency" when a value of a status node for a fire sensor temperature detector reading exceeds 90 degrees Celsius. It will be appreciated that in cases of deployments of hundreds or thousands of such temperature sensors are across one or more monitored buildings, the bandwidth, latency, processor usage, and memory usage savings offered by replacing client polling with standing database queries 28 can be significant.

Turning now to FIG. 1B, another configuration of distributed database computing system 10A is illustrated, which is similar in many respects to distributed database computing system 10 of FIG. 1A. For the sake of brevity, only differences between the systems 10, 10A will be described herein. One primary difference between the systems 10, 10A is that distributed database computing system 10A is configured with database servers 16 executing the reactive database API 20, standing query engine 26, and graph engine 22, rather than analytics servers 18 as in distributed database computing system 10. Thus, in the configuration of FIG. 1B, the graph engine can, if desired, generate the graph representation 20C based directly on the column compressed representation 20B, or if desired based on the row representation 20A, rather than reading out the compressed dataframes 48 from off cluster storage 50 in order to generate the graph representation 20C. Graph engine 22 of system 10A may, for example, be the MICROSOFT® AZURE COSMOS DB GREMLIN API, although use of other graph engines is certainly contemplated.

Figure 2:
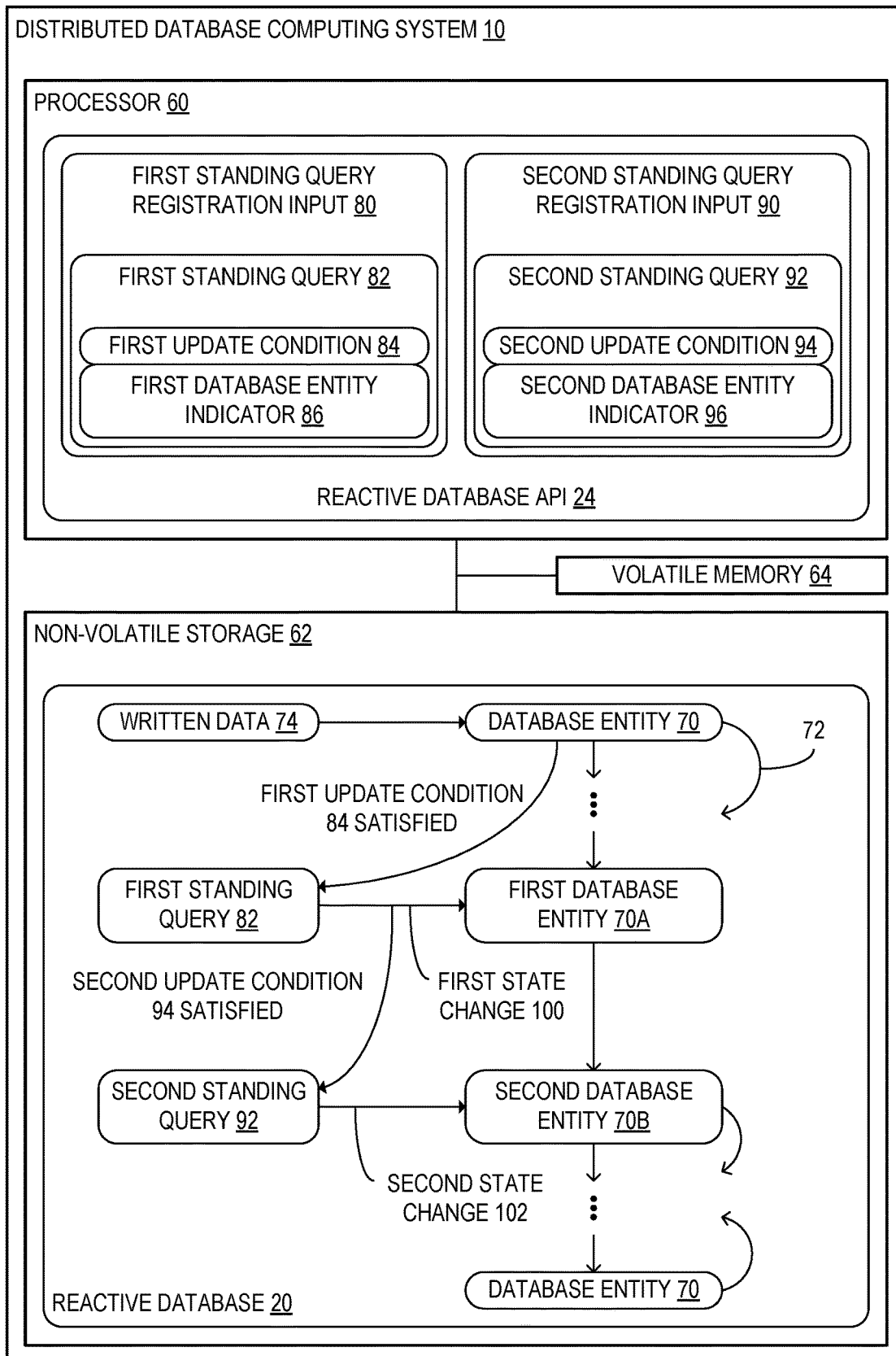
FIG. 2 schematically shows a computing system including non-volatile storage configured to store a reactive database, according to the example of FIG. 1A.

Turning now to FIG. 2, a view of distributed database computing system 10 is shown that illustrates the use of the system 10 to evaluate multiple standing queries 28. As shown, the distributed database computing system 10 may include a processor 60 and non-volatile storage 62 that are communicatively coupled. In addition, the distributed database computing system 10 may further include volatile memory 64 that is communicatively coupled to the processor 60 and the non-volatile storage 62. In the example of FIG. 2, the processor 60, non-volatile storage 62, and volatile memory 64 are shown within a single physical computing device. However, in other examples, the functionality of the processor 60 the non-volatile storage 62, and/or the volatile memory 64 may be distributed across a plurality of communicatively coupled physical computing devices, as depicted in the examples of FIGS. 1A and 1B. The plurality of physical computing devices may, in such examples, be a plurality of server computing devices located in a data center. In some examples, the non-volatile storage 62 may include the on-cluster storage 42 and the off-cluster storage 50. In addition, the processor 60 may include a plurality of physical processing devices located at the database servers 16 and/or the analytics servers 18.

The non-volatile storage 62 may store a reactive database 20, which may include a plurality of database entities 70. The plurality of database entities 70 may be records stored in the reactive database 20. In some examples, as discussed above with reference to FIGS. 1A and 1B, the reactive database 20 may be a relational database in which the database entities 70 are stored in one or more rows of at least one table. Alternatively, the reactive database 20 may be a document-store database in which the plurality of database entities 70 are stored as a plurality of documents, an object-oriented database in which the plurality of database entities 70 are stored as a plurality of objects, or a graph database in which the plurality of database entities 70 are stored as a plurality of nodes in a graph structure. As discussed in further detail below, the processor 60 may, in some examples, be configured to generate a plurality of representations of the reactive database 20 that may represent the plurality of database entities 70 with different database types. FIG. 2 shows the reactive database 20 represented as a graph database.

The processor 60 of the distributed database computing system 10 may be configured to execute a reactive database application program interface (API) 24. The processor 60 may be configured to process queries to the reactive database 20, as well as the responses 30 to those queries, at the reactive database API 24. The reactive database API 24 may be executed at the database servers 16, as depicted in FIG. 1B, or at the analytics servers 18, as depicted in FIG. 1A. Via the reactive database API 24, the processor 60 may be configured to receive input specifying one or more queries to the reactive database 20. The input may be received from a user via a user interface or may be programmatically input by one or more computing processes executed at one or more database client computers 12. In addition, the one or more query responses 30 to the one or more queries may be communicated to the user or to one or more computing processes over the reactive database API 24.

Via the reactive database API 24, the processor 60 may be configured to receive a first standing query registration input 80 including a first standing query 82 at the register standing queries module 25. The first standing query 82 is a query to the reactive database 20 that is configured to be executed in response to a specific indicated condition being fulfilled. The first standing query 82 may include a first update condition 84 that indicates a condition under which the first standing query 82 is configured to be programmatically executed. In some examples, the first update condition 84 may further indicate one or more database entities 70 of the plurality of database entities 70 at which the first update condition 84 may occur. For example, the first update condition 84 may occur when a value stored in an indicated database entity 70 surpasses a predetermined threshold. In other examples, the first standing query 82 may have a first update condition 84 that does not refer to the data included in a database entity 70. In such examples, the first standing query 82 may indicate one or more structural properties of the reactive database 20 and/or one or more structural changes to the reactive database 20 that fulfill the first update condition 84. For example, the first update condition 84 may occur whenever a new database entity 70 is added to the reactive database 20.

The first standing query 82 may further include a first database entity indicator 86 that indicates a first database entity 70A of the plurality of database entities 70 with which the first standing query 82 is associated. As discussed in further detail below, the first database entity 70A may be the database entity at which the first standing query 82 is configured to be executed in response to the first update condition 84 being satisfied. Subsequently to receiving the first standing query registration input 80, the processor 60 may be further configured to store the first standing query 82 in the non-volatile storage 62.

The processor 60 may be further configured to write data 74 that fulfills the first update condition 84 to the reactive database 20. The written data 74 may be written to the first database entity 70A or to some other database entity 70 that is indicated by the first update condition 84. The written data 74 may be written to the reactive database 20 in a database transaction and may be included in a SQL update query 34 as shown in FIGS. 1A and 1B.

The processor 60 may be further configured to determine that the first update condition 84 is satisfied by the written data 74. In some examples, whenever data is written to one or more database entities 70 specified in the first update condition 84, the processor 60 may be configured to check whether the data satisfies the first update condition 84. In other examples, when the first update condition 84 refers to one or more structural properties of the reactive database 20, the processor 60 may be configured to check whether the reactive database 20 satisfies the one or more structural properties whenever a structural modification is made to the reactive database 20.

In response to determining that the first update condition 84 is satisfied, the processor 60 may be further configured to execute the first standing query 82 to perform a first state change 100 at the first database entity 70A of the plurality of database entities 70. The first state change 100 may be a change to one or more values stored in the reactive database 20 and/or to an architecture of the reactive database 20. When the first state change 100 includes a modification to one or more values stored in the reactive database 20, performing the first state change 100 may include updating a value of the first database entity 70A. In some examples, performing the first state change 100 may further include updating the respective values of one or more other database entities 70 of the plurality of database entities 70. When the first state change 100 includes a change to the architecture of the reactive database 20, performing the first state change 100 may include adding one or more database entities 70, deleting one or more database entities 70, or modifying a relational structure of two or more database entities 70 (e.g. by moving a database entity 70 to a different row). The first state change 100 may be performed in a reactive update query 32 to the row representation 20A of the reactive database 20.

In some examples, the first standing query 82 may be associated with two or more database entities 70 including the first database entity 70A. In such examples, executing the first standing query 82 may include performing two or more respective state changes, including the first state change 100, at the two or more database entities 70. The processor 60 may, in such examples, be configured to perform the same state change on the two or more database entities 70 or to perform different state changes on the two or more database entities 70.

Figure 3:
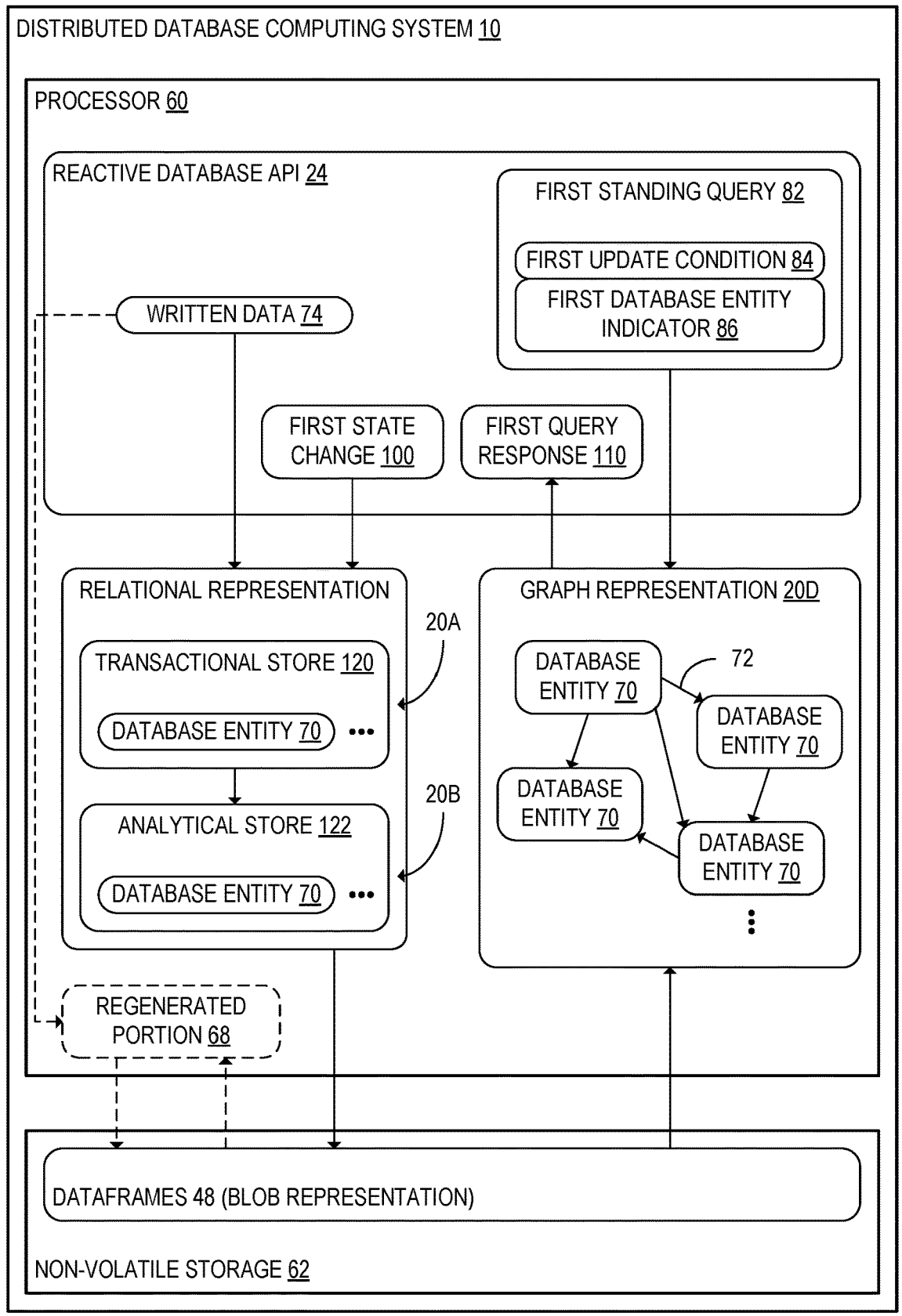
FIG. 3 schematically shows the example computing system of FIG. 1A when a relational representation, a binary large object (blob) representation, and a graph representation are generated for the reactive database.

FIG. 3 schematically depicts the distributed database computing system 10 when a plurality of different representations of the reactive database 20 are generated. In the example of FIG. 3, the reactive database 20 initially has a relational representation in which the reactive database 20 is structured as a relational database. The relational representation of the reactive database 20 may be a row representation 20A or a column representation 20B. In the row representation 20A, the plurality of database entities 70 may be stored in a transactional store 120 including one or more rows. In the column representation 20B, the plurality of database entities 70 may be stored in an analytical store 122 that includes one or more columns. The one or more columns of the analytical store 122 may indicate one or more respective attributes of the database entities 70.

The processor 60 may be further configured to generate a binary large object (blob) representation of the reactive database 20 from the relational representation 20A or 20B of the reactive database 20. The blob representation may take the form of the plurality of dataframes 48 stored in the off-cluster storage 50 as shown in the example of FIGS. 1A and 1B. The reactive database 20 may be stored in the non-volatile storage 62 in the blob representation 48. Generating the blob representation from the relational representation 20A or 20B may allow the non-volatile storage 62 to store the relational representation 20A or 20B of the reactive database 20 in a more storage-efficient format. The relational representation 20A or 20B may, in some examples, be deleted from the non-volatile storage 62 subsequently to generating the blob representation of the reactive database 20. Alternatively, as shown in FIGS. 1A and 1B, the row representation 20A may be maintained in on-cluster storage 42. In example in which the relational representation 20A or 20B is deleted, when a query to the reactive database 20 is performed, the processor 60 may be configured to regenerate at least a portion 68 of the relational representation 20A or 20B to which the query is performed.

The processor 60 may be further configured to generate a graph representation 20C of the reactive database 20. The graph representation 20C may be generated from the blob representation 48. In the graph representation 20C, the plurality of database entities 70 may be represented as a plurality of database nodes connected by a plurality of edges 72. The graph representation 20C may be structured as a directed graph, as shown in the example of FIG. 3. Alternatively, the graph representation 20C may be structured as an undirected graph. In examples in which the first state change 100 includes a change to the architecture of the reactive database 20 that is performed at the first database entity 70A, the change to the architecture may include adding and/or deleting one or more edges 72 connected to the first database entity 70A while retaining the first database entity 70A in the reactive database 20. Alternatively, the change to the architecture of the reactive database 20 may include deleting the first database entity 70A. Changes to the architecture of the reactive database 20 may further include adding and/or deleting one or more other edges 72 and/or database entities 70.

When the processor 60 writes the written data 74 to the reactive database 20, as discussed above, the processor 60 may be configured to write the written data 74 to the relational representation 20A or 20B of the reactive database 20. As discussed above, the row representation 20A may be configured for high write speed. The written data 74 may be written to a regenerated portion 68 of the relational representation 20A or 20B in examples in which the relational representation 20A or 20B is deleted subsequently to the generation of the blob representation 48. Writing the written data 74 to the row representation 20A, rather than to the column representation 20B, the blob representation 48, or the graph representation 20C, may be more efficient in terms of processing and memory used.

Subsequently to writing the written data 26 to the relational representation 20A or 20B, the processor 60 may be further configured to update the blob representation 48 stored in the non-volatile storage 62 based at least in part on the written data 74. In addition, subsequently to updating the blob representation 48, the processor 60 may be further configured to update the graph representation 20C based at least in part on the updated blob representation 48. Thus, a write to the relational representation 20A or 20B may be propagated to the blob representation 48 and the graph representation 20C. Writes may, in some examples, be propagated to the blob representation 48 and the graph representation 20C at a predetermined updating interval.

When the processor 60 determines that the first update condition 84 is satisfied by the written data 74, the processor 60 may be configured to make such a determination at the graph representation 20C of the reactive database 20. The processor 60 may be further configured to execute the first standing query 82 at the graph representation 20C. In addition, the processor 60 may be configured to receive a first query response 110 to the first standing query 82 from the graph representation 20C via the reactive database API 24. By checking the first update condition 84 and performing the first standing query 82 at the graph representation 20C, the first update condition 84 may be checked and the first standing query 82 may be performed with lower latency than at the relational representation 20A or 20B or the blob representation 48.

Figure 4:
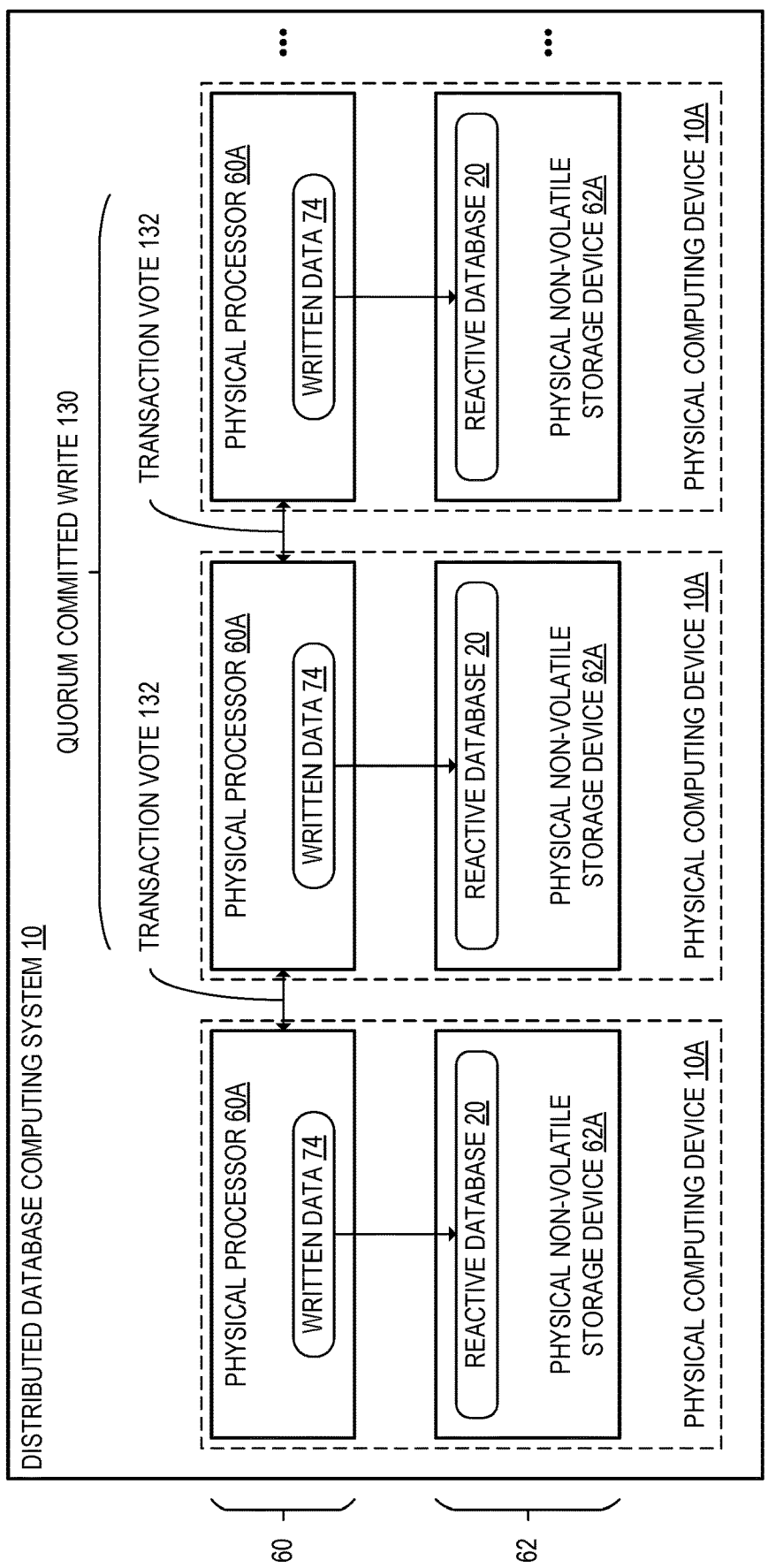
FIG. 4 schematically shows the example computing system of FIG. 1A when a quorum committed write is performed at a plurality of physical computing devices.

In some examples, as discussed above, the non-volatile storage 62 may be distributed between a plurality of physical non-volatile storage devices 62A. FIG. 4 schematically shows an example in which the distributed database computing system 10 is divided between a plurality of physical computing devices 10A that each include a respective physical processor 60A and a physical non-volatile storage device 62A. In the example of FIG. 4, the plurality of physical processors 60A form the processor 60 and the plurality of physical non-volatile storage devices 62A form the non-volatile storage 62. The plurality of physical non-volatile storage devices 62A may store respective copies of the reactive database 20.

In the example of FIG. 4, the written data 74 may be written to the reactive database 20 in a quorum committed write 120 to the physical non-volatile storage devices 62A. In the quorum committed write 130, the plurality of physical processors 60A may be configured to cast transaction votes 132 on whether to commit transactions to write the written data 74 to the respective copies of the reactive database 20. The plurality of physical processors 60A may be configured to commit the transactions and write the written data 74 to the physical non-volatile storage devices 62A when a number of the physical processors 60A greater than or equal to a predefined number vote to commit the transaction rather than to abort the transaction. For example, the plurality of physical processors 60A may have a quorum to commit the transaction when a majority of the physical processors 60A vote to commit the transaction. Writing the written data 74 to the copies of the reactive database 20 in a quorum committed write 130 may provide transaction atomicity and serializability.

In addition to writing the written data 74 to the reactive database 20 in a quorum committed write 130, the plurality of physical processors 60A may also be configured to perform first state change 100 at the first database entity 70A in a quorum committed write 130. Thus, atomicity and serializability may be achieved for the first state change 100 as well as for writing the written data 74.

In some examples, as shown in FIG. 2, the processor 60 may be further configured to receive a second standing query registration input 90 including a second standing query 92 via the reactive database API 24. The processor 60 may be further configured to store the second standing query 92 in the non-volatile storage 62 in response to receiving the second standing query registration input 90. The second standing query 92 may include a second update condition 94, which may include the first state change 100. Accordingly, the first standing query 82 and the second standing query 92 may be sequentially ordered such that performing the first state change 100 in response to satisfaction of the first update condition 84 is a precondition for executing the second standing query 92. In addition to the first state change 100, the second update condition 94 may further include one or more additional criteria for executing the second standing query 92. In the graph representation 20C of the reactive database 20, the second standing query 92 may be associated with a second database entity 70B of the plurality of database entities 70 that is connected to the first database entity 70A by an edge 72 of the plurality of edges 72. The second database entity 70B may be further connected to one or more other database entities 70 in addition to the first database entity 70A.

Subsequently to storing the second standing query 92 in the non-volatile storage 62, and in response to performing the first state change 100, the processor 60 may be further configured to determine that the second update condition 94 is satisfied. The processor 60 may be configured to determine that the second update condition 94 is satisfied at least in part by referring to the graph representation 20C of the reactive database 20. In response to determining that the second update condition 94 is satisfied, the processor 60 may be further configured to execute the second standing query 92 to perform a second state change 102 at the second database entity 70B. The second state change 102 may be performed as a reactive update query 32. Similarly to the first state change 100, the second state change 102 may be a change to one or more values stored in the reactive database 20 and/or to an architecture of the reactive database 20. When the second state change 102 includes a change to one or more values stored in the reactive database 20, performing the second state change 102 may include updating a value of the second database entity 70B, and additionally or alternatively one or more other database entities 70. When the second state change 102 includes a change to the architecture of the reactive database 20, the second state change 102 may include, for example, adding one or more edges 72 connected to the second database entity 70B, deleting one or more edges 72 connected to the second database entity 70B, or deleting the second database entity 70B. One or more other database entities 70 and/or one or more edges 72 connected to the one or more other database entities 70 may also be modified by the second state change 102. In some examples, the processor 60 may be configured to perform the second state change 102 in a quorum committed write 130 to a plurality of physical non-volatile storage devices 62A.

Figure 5:
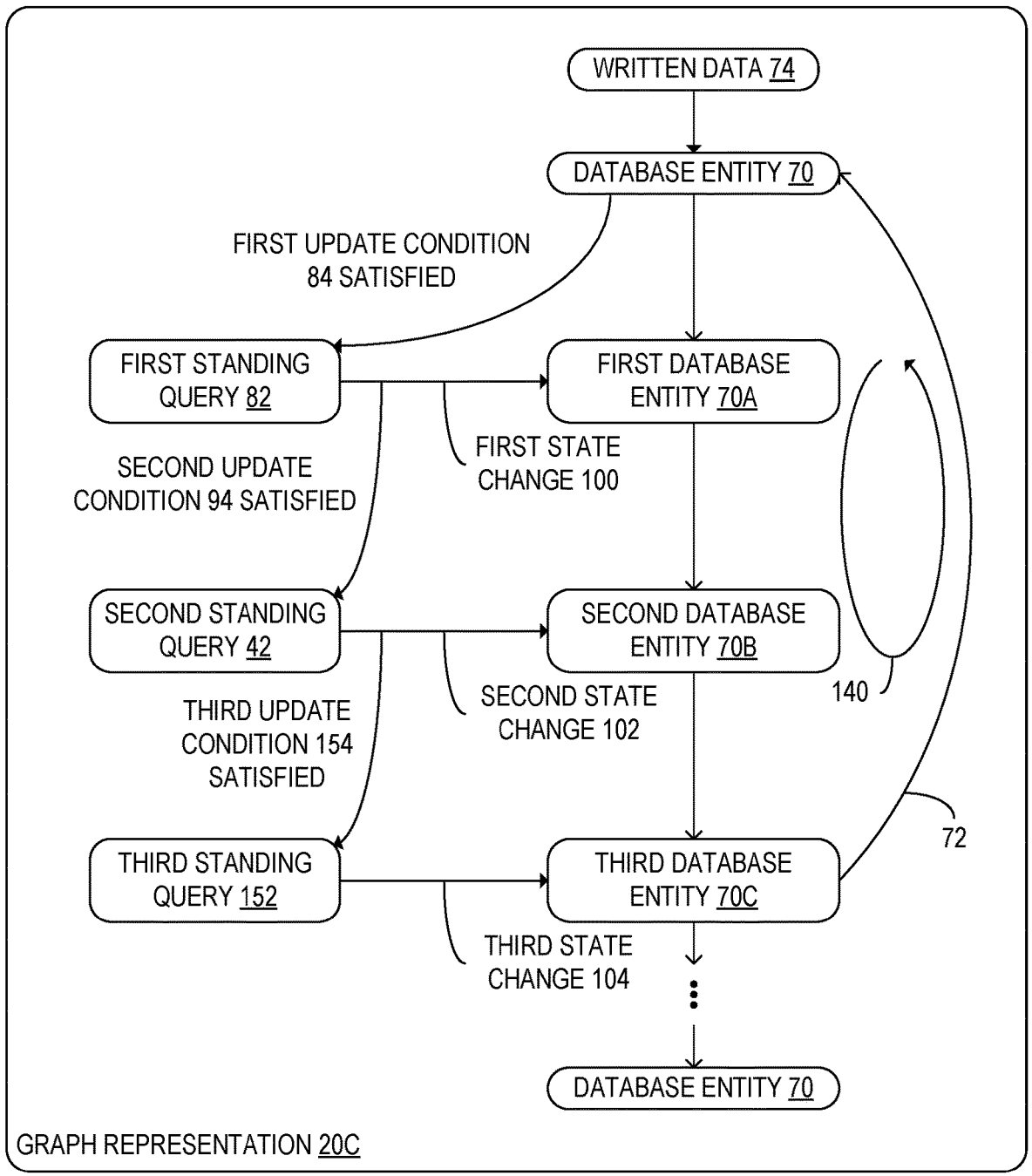
FIG. 5 schematically shows the example computing system of FIG. 1A when the graph representation of the reactive database has a graph structure with at least one cycle.

In some examples, as schematically depicted in FIG. 5, the plurality of database entities 70 and edges 72 of the graph representation 20C of the reactive database 20 may have a graph structure with at least one cycle 140. FIG. 5 shows an example graph representation 20C including the first database entity 70A, the second database entity 70B, and a third database entity 70C at which the first standing query 82, the second standing query 92, and a third standing query 152 are respectively configured to be performed. In the example of FIG. 5, satisfying the first update condition 84 includes writing the written data 72 to a particular database entity 70 of the plurality of database entities 70. Satisfying the second update condition 94 includes performing the first state change 100 at the first database entity 70A. Satisfying a third update condition 154 of the third standing query 152 includes performing the second state change 102 at the second database entity 70B. The third standing query 152 is configured to be executed at least at the third database entity 70C. When the third standing query 152 is performed, the processor 60 may be configured to perform a third state change 104 at the third database entity 70C.

In the example of FIG. 5, the graph representation 20C of the reactive database 20 includes a cycle between the database entity 70 to which the written data 74 is written, the first database entity 70A, the second database entity 70B, and the third database entity 70C. Performing the third standing query 152 includes updating the database entity 70 indicated by the first update condition 84. Thus, performing the third standing query 152 may write data that satisfies the first update condition 84 to the database entity 70 indicated by the first update condition 84, thereby resulting in an additional execution of the first standing query 82. In response to determining that the first update condition 84 is satisfied, the processor 60 may be configured to perform a plurality of state changes, including the first state change 100, the second state change 102, and the third state change 104, in a state change sequence that includes one or more iterations through the at least one cycle 140 of the graph structure. Thus, the processor 60 may be configured to iteratively loop through the cycle 140 until an update fails to satisfy one of the update conditions included in the cycle 140.

As discussed above, in examples in which transactions to write the written data 74 to the reactive database 20 and perform state changes to database entities 70 are performed in quorum committed writes 130, such transactions may be serializable. Thus, in such examples, the ordering of the state changes in the state change sequence may be consistent.

Figure 6:
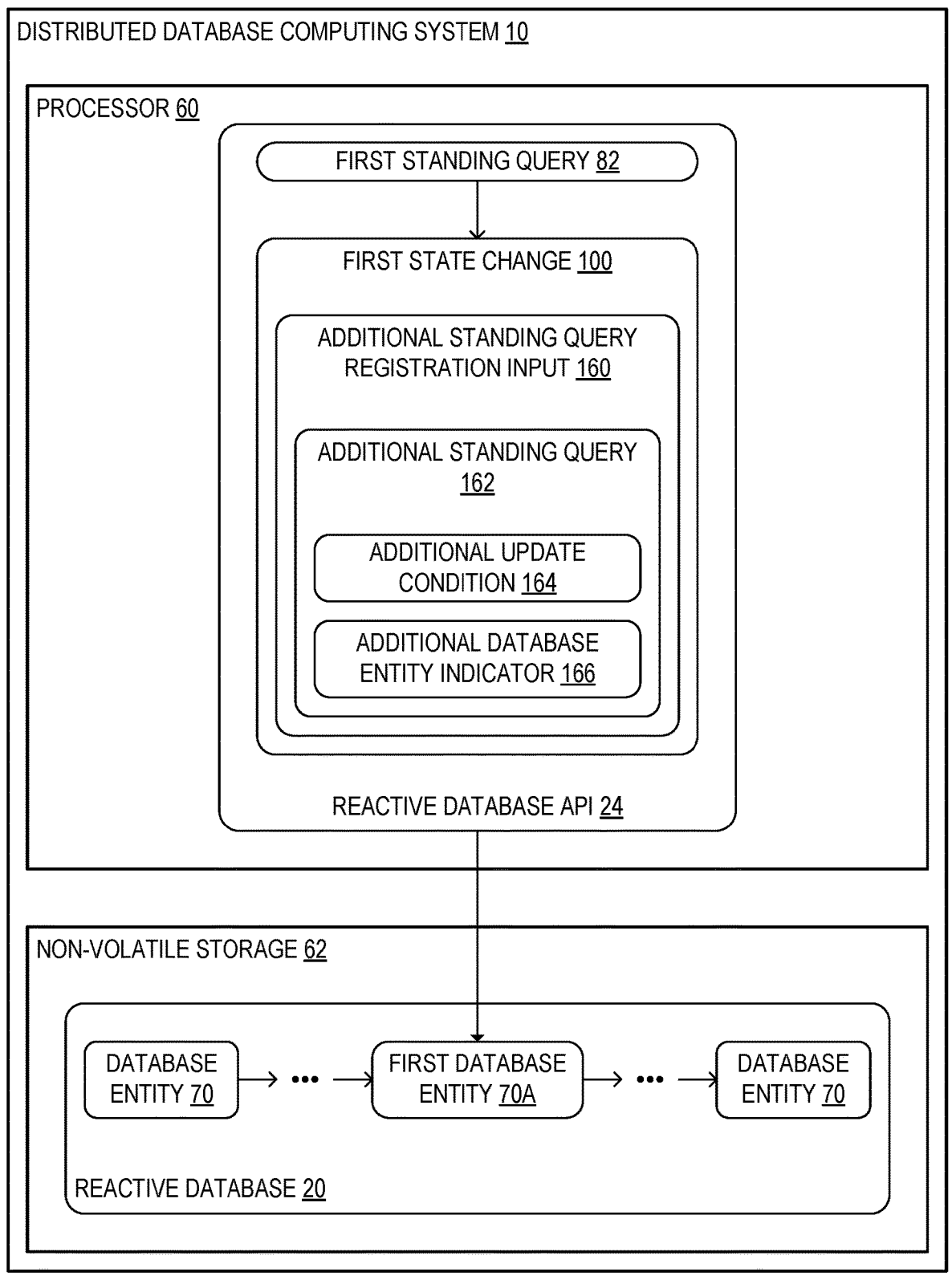
FIG. 6 schematically shows the example computing system of FIG. 1A when executing a first standing query to the reactive database includes adding an additional standing query.

Turning now to FIG. 6, the first state change 100 may, in some examples, include generating an additional standing query 162 associated with the first database entity 70A. In examples in which the first state change 100 includes generating an additional standing query 162, the first state change 100 may include making an additional standing query registration input 160 at the reactive database API 24. The additional standing query 162 may include an additional update condition 164 under which the additional standing query 162 is configured to be performed. The additional standing query 162 may further include an additional database entity indicator 166 that indicates one or more database entities 70, including the first database entity 70A, at which the additional standing query 162 is configured to be performed. The first state change 100 may further include storing the additional standing query 162 in the non-volatile storage 62.

In examples in which the first standing query 82 is associated with two or more database entities 70 including the first database entity 70A, the first state change 100 may include generating two or more respective additional standing queries 162 associated with the two or more database entities. The first state change 100 may further include storing the two or more additional standing queries 162 in the non-volatile storage 62. Thus, when the first standing query 82 is executed, a plurality of additional standing queries 162 may be added to the reactive database 20 in some examples.

Figure 7:
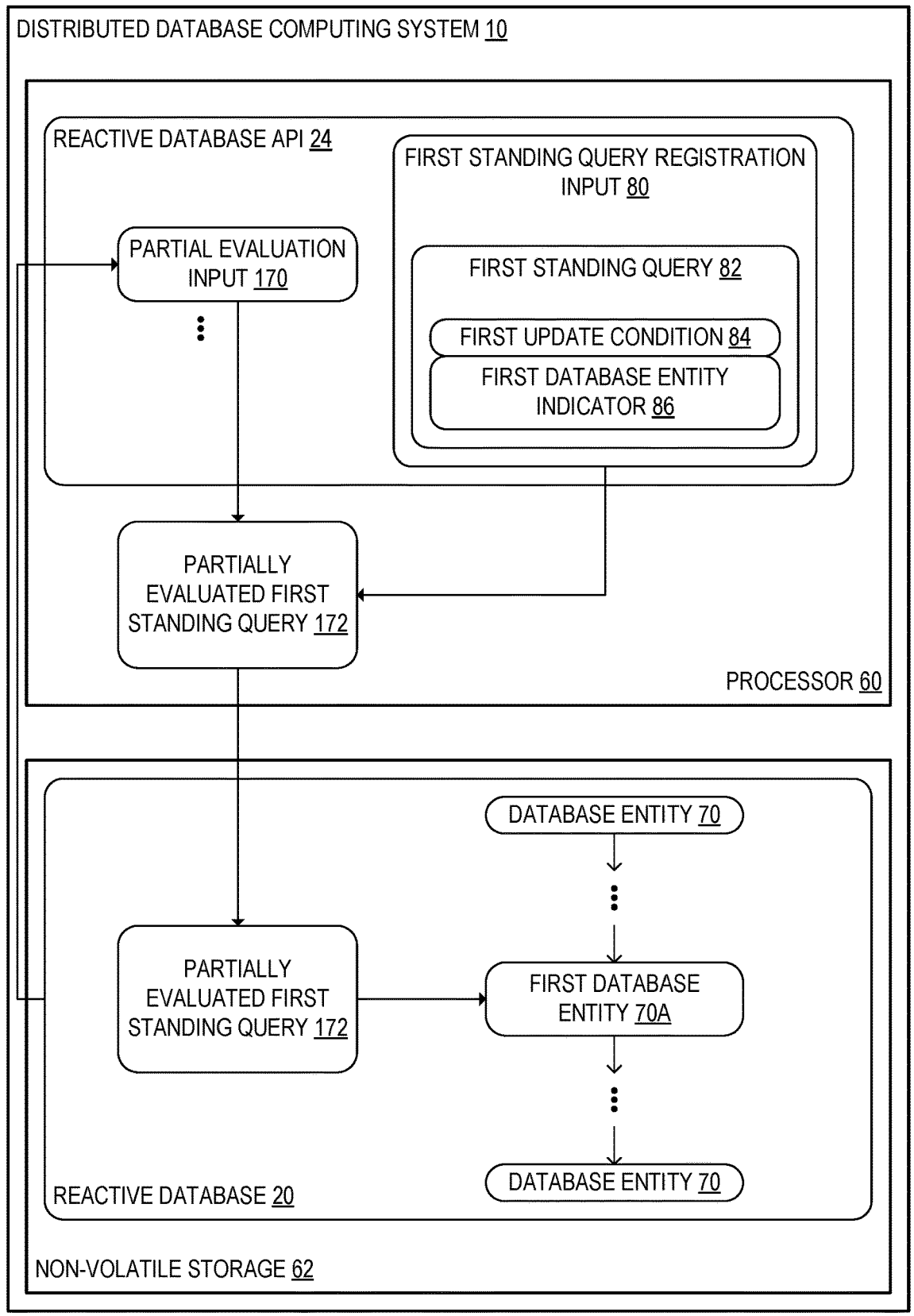
FIG. 7 schematically shows the example computing system of FIG. 1A when the first standing query is partially evaluated.

FIG. 7 schematically shows the computing system 10 in an example in which the processor 60 is further configured to partially evaluate the first standing query 82 in response to receiving the first standing query registration input 80. When the processor 60 partially evaluates the first standing query 82, the processor 60 may be configured to input one or more partial evaluation inputs 170 into the first standing query 82 and compute a partially evaluated first standing query 172 from the one or more partial evaluation inputs 170. The one or more partial evaluation inputs 170 may, for example, include data stored in one or more database entities 70 of the reactive database 20 that are received at the processor 60 via the reactive database API 24 as one or more query responses 30. The partially evaluated first standing query 172 may, in some examples, be computed from the graph representation 20C of the reactive database 20 at the analytics servers 18. Subsequently to partially evaluating the first standing query 82, the processor 60 may be further configured to store the partially evaluated first standing query 172 in the non-volatile storage 62.

In examples in which the processor 60 is configured to store the partially evaluated first standing query 172 in the non-volatile storage 62, the processor 60 may be further configured to execute the partially evaluated first standing query 172 in response to determining that the first update condition 84 is satisfied. By storing and executing the first standing query 82 in partially evaluated form, the processor 60 may avoid having to recompute the entire first standing query 82 whenever the first standing query 82 is executed.

In some examples, additionally or alternatively to partially evaluating the first standing query 82, the processor 60 may be configured to partially evaluate the second standing query 92 and store the partially evaluated second standing query in the non-volatile storage 62. In examples in which three or more standing queries are stored in the non-volatile storage 62, as in the example of FIG. 5, one or more other standing queries may also be partially evaluated and stored in the non-volatile storage 62 in partially evaluated form.

In some examples, the reactive database 20 may be a digital twin model in which the plurality of database entities 70 and the plurality of edges 72, as represented in the graph representation 20C, are configured to model a physical system. For example, the graph structure of the graph representation 20C may represent a plurality of physical devices in an Internet of Things (IoT) system with database entities 70 and may represent interactions between the physical devices with edges 72. In another example, the reactive database 20 may represent computing devices and resources in a cloud computing environment. The graph representation 20C of the reactive database 20 may, in another example, be an identity graph of members of an organization or users of a social network.

Figure 8A:
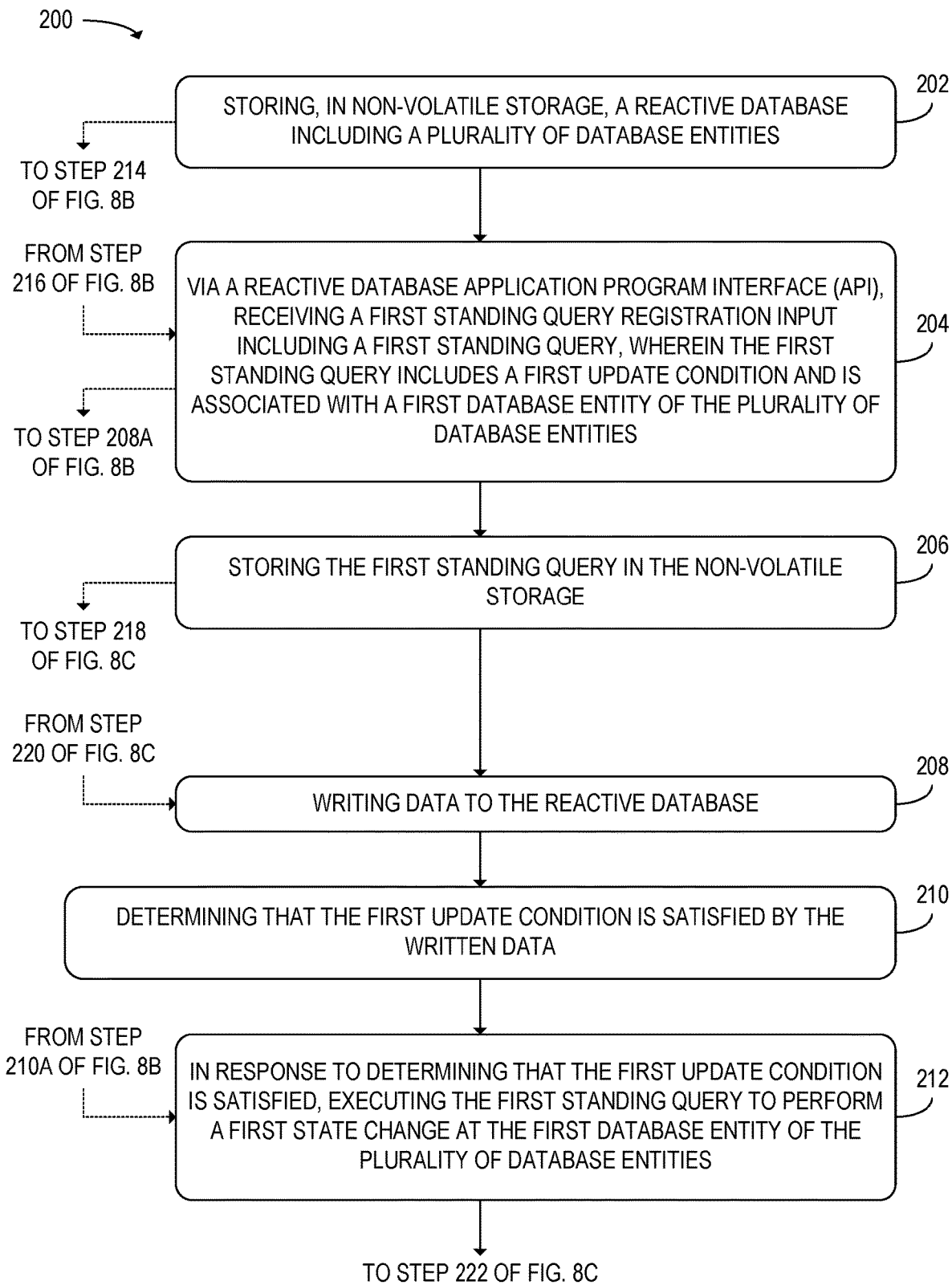
FIG. 8A shows a flowchart of an example method for use with a computing system at which a reactive database is stored in non-volatile storage, according to the example of FIG. 1A.

FIG. 8A shows a flowchart of an example method 200 for use with a distributed database computing system. The method 200 may be used with the example distributed database computing system 10 of FIG. 1A, the example distributed database computing system 10A of FIG. 1B, some other distributed database computing system. The steps of the method 200 may be executed at least in part by a processor included in the distributed database computing system. At step 202, the method 200 may include storing, in non-volatile storage, a reactive database including a plurality of database entities. The plurality of database entities may be records stored in the reactive database that may, for example, be represented as entries in a relational database, documents in a document-store database, objects in an object-oriented database, or nodes in a graph database. The non-volatile storage in which the reactive database is stored may be provided in a single physical non-volatile storage device or across a plurality of non-volatile storage devices.

At step 204, the method 200 may further include receiving a first standing query registration input including a first standing query. The first standing query may include a first update condition under which the first standing query is configured to be executed. The first update condition may, for example, indicate one or more database entities that are configured to be monitored in order to determine whether the first update condition is satisfied. In addition, the first standing query may be associated with a first database entity of the plurality of database entities at which the first standing query is configured to be executed, as indicated by a first database entity indicator included in the first standing query registration input. In some examples, the first standing query registration input may indicate that the first standing query is associated with two or more database entities including the first database entity. The first standing query registration input may be received via a reactive database API executed at the processor of the computing system. At step 206, the method 200 may further include storing the first standing query in the non-volatile storage.

At step 208, the method 200 may further include writing data to the reactive database. The written data may be written to the reactive database in a database transaction performed on one or more of the database entities of the reactive database. In some examples, when copies of the reactive database are stored on a plurality of physical non-volatile storage devices, the written data may be written to the copies reactive database in a quorum committed write. In the quorum committed write, a plurality of physical processors may exchange transaction votes on whether to commit the transaction to write the written data to the reactive database. The transaction may be committed when a threshold number of the physical processors vote to commit the transaction.

At step 210, the method 200 may further include determining that the first update condition is satisfied by the written data. In examples in which one or more database entities are monitored for satisfaction of the first update condition, as specified by the first standing query registration input, the first update condition may be checked for satisfaction whenever a write is made to those one or more database entities.

At step 212, in response to determining that the first update condition is satisfied, the method 200 may further include executing the first standing query to perform a first state change at the first database entity of the plurality of database entities. For example, the first state change may be a change to one or more values stored in the reactive database. Additionally or alternatively, the first state change may be a change to an architecture of the reactive database. In examples in which the first standing query is associated with two or more database entities of the reactive database, executing the first standing query may include performing two or more respective state changes, including the first state change, at the two or more database entities.

In some examples, the first state change may include generating an additional standing query associated with the first database entity and storing the additional standing query in the non-volatile storage. The first state change may, in such examples, include an additional standing query registration input that defines the additional standing query.

The first state change may be performed in a quorum committed write in examples in which the computing system includes a plurality of physical non-volatile storage devices that store a respective plurality of copies of the reactive database. The quorum committed write may be performed at a plurality of database servers in which the plurality of physical non-volatile storage devices are included.

Figure 8B:
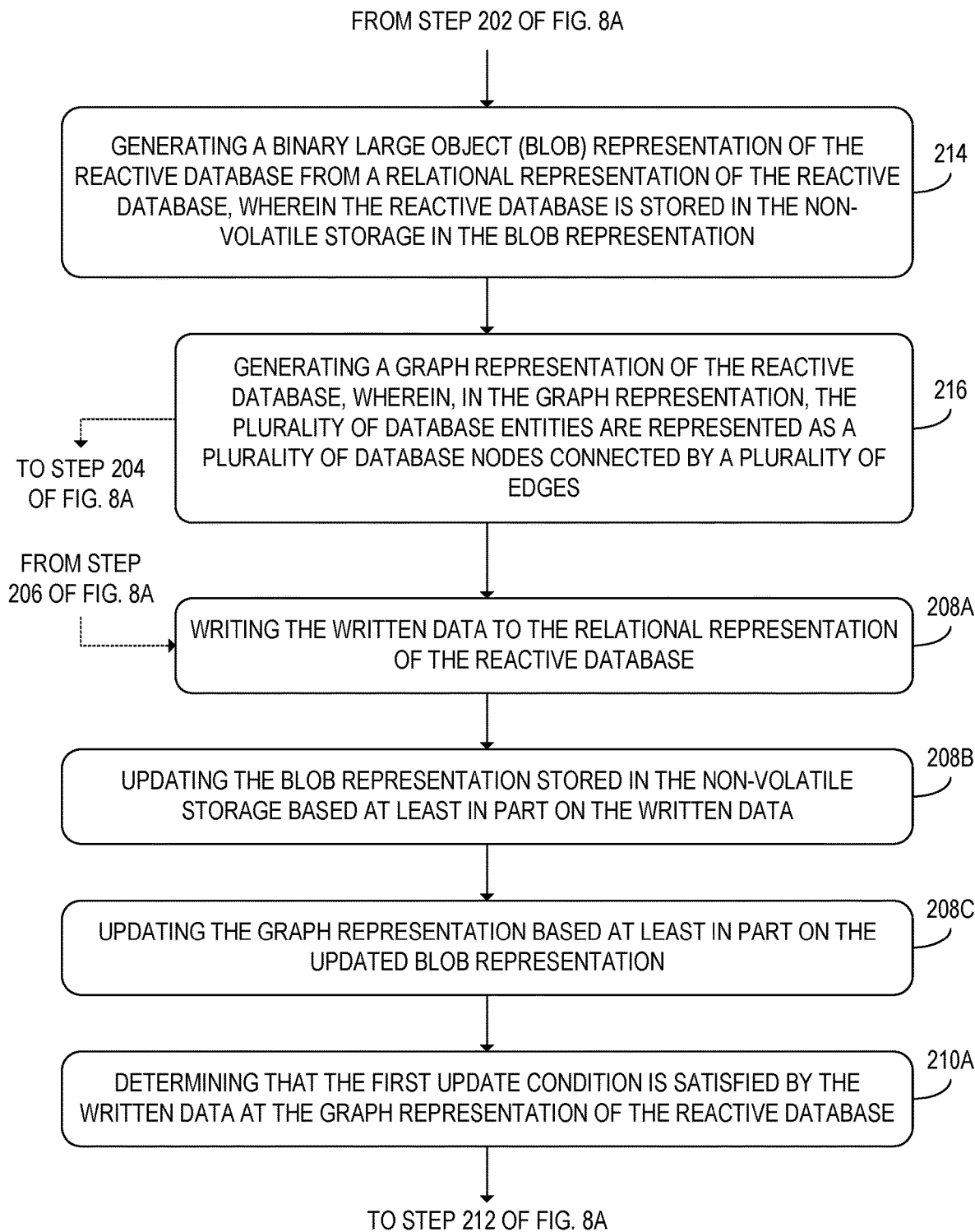
FIGS. 8B-8D show additional steps of the method of FIG. 8A that may be performed in some examples.

FIG. 8B shows additional steps of the method 200 that may be performed in some examples. Step 214 of the method 200 may be performed subsequently to step 202. At step 214, the method 200 may further include generating a binary large object (blob) representation of the reactive database from a relational representation of the reactive database. The blob representation and the relational representation may, in some examples, be stored in separate physical non-volatile storage devices. For example, the relational representation may be stored in on-cluster storage at a plurality of database servers, whereas the blob representation may be stored as a plurality of dataframes at one or more off-cluster storage devices. In the relational representation, the database entities of the reactive database may be organized into one or more rows and stored in a row representation in a transactional store. Additionally or alternatively, the database entities in the relational representation may be organized into one or more columns and stored in a column representation in an analytical store. The database entities may be organized into the one or more columns according to one or more respective attributes of the database entities. The blob representation may have a higher storage efficiency than the relational representation, while the relational representation may have a faster write speed than the blob representation. In some examples, subsequently to generating the blob representation, the relational representation may be deleted from the non-volatile storage. Alternatively, the relational representation may be retained in the on-cluster storage of the database servers.

At step 216, the method 200 may further include generating a graph representation of the reactive database. In the graph representation, the plurality of database entities may be represented as a plurality of database nodes connected by a plurality of edges. The graph representation may be structured as a directed graph or an undirected graph. The graph representation of the reactive database may be generated from the blob representation and may be generated at one or more database servers or analytics servers.

The method 200 may further include step 208A, which may be performed in some examples when the written data is written to the reactive database at step 208. At step 208A, the method 200 may further include writing the written data to the relational representation of the reactive database. The written data may be written to the row representation and/or the column representation. In response to receiving the written data, at least a portion of the relational representation may be regenerated in examples in which the relational representation is deleted after generating the blob representation. The written data may be written to the regenerated portion of the relational representation.

In examples in which step 208A is performed, the method 200 may further include, at step 208B, updating the blob representation stored in the non-volatile storage based at least in part on the written data. In addition, subsequently to performing step 208B, the method 200 may further include updating the graph representation based at least in part on the updated blob representation. Accordingly, updates to the reactive database may be made in an efficient manner at the relational representation and propagated to the blob representation and the graph representation.

The method 200 may further include step 210A, which may be performed when step 210 is performed. At step 210A, the method 200 may further include determining that the first update condition is satisfied by the written data at the graph representation of the reactive database. By referring to the graph representation of the reactive database rather than the relational representation or the blob representation, latency associated with checking the first update condition may be reduced. Subsequently to step 210A, step 212 may be performed as shown in FIG. 8A.

Figure 8C:
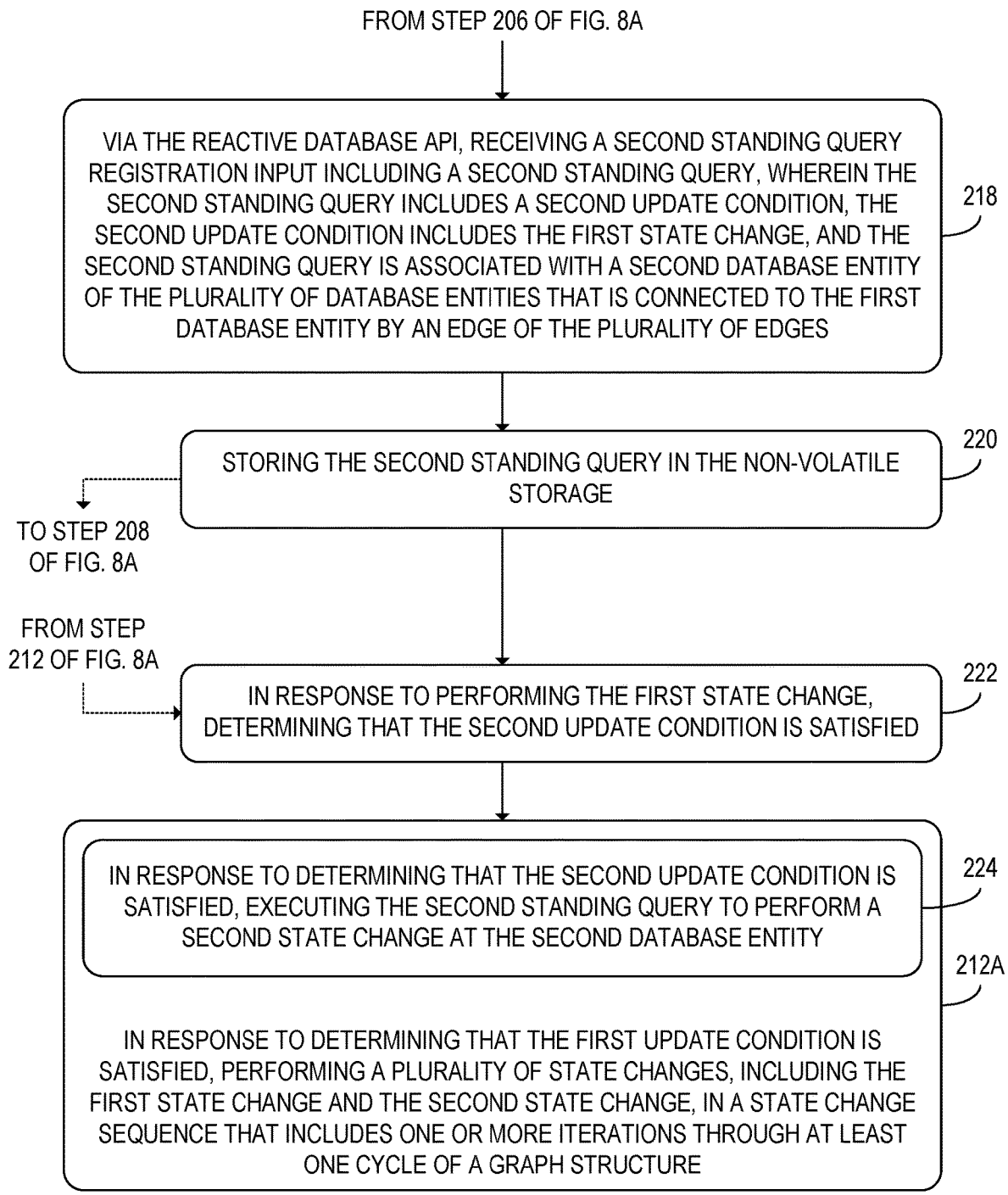

FIG. 8C shows additional steps of the method 200 that may be performed in some examples. Step 218 of the method 200 may be performed subsequently to step 206 of FIG. 8A. At step 218, the method 200 may further include receiving a second standing query registration input including a second standing query. The second standing query registration input may be received via the reactive database API. The second standing query included in the second standing query registration input may include a second update condition under which the second standing query is configured to be executed. The second update condition may include the first state change such that the second standing query is configured to be executed in response to at least performing the first state change. One or more other conditions for executing the second standing query may also be included in the second update condition in some examples. In addition, the second standing query may be associated with a second database entity of the plurality of database entities. The second database entity may be connected to the first database entity by an edge of the plurality of edges included in the graph representation of the reactive database. At step 220, the method 200 may further include storing the second standing query in the non-volatile storage.

Step 222 of the method 200 may be performed in response to performing the first state change at step 212. At step 222, the method 200 may further include determining that the second update condition is satisfied. At step 224, in response to determining that the second update condition is satisfied, the method 200 may further include executing the second standing query to perform a second state change at the second database entity. The second state change may include a change to one or more values stored in the reactive database, including the value stored in the second database entity. Additionally or alternatively, the second state change may include a modification to the architecture of the reactive database that affects the second database entity, such as by adding one or more edges connected to the second database entity, deleting one or more edges connected to the second database entity, or deleting the second database entity.

The second state change may be performed in a quorum committed write in examples in which copies of the reactive database are stored in a plurality of physical non-volatile storage devices. Thus, the first state change and the second state change may be serializable.

In some examples, the plurality of database entities and edges of the graph representation of the reactive database may have a graph structure with at least one cycle. In such examples, step 212 and step 224 may be performed during step 212A of the method 200. At step 212A, in response to determining that the first update condition is satisfied, the method 200 may further include performing a plurality of state changes in a state change sequence that includes one or more iterations through the at least one cycle of the graph structure. The plurality of state changes performed in such examples includes the first state change and the second state change. Thus, in examples in which step 212A is performed, the reactive database may loop through a sequence of state changes on the cycle of database entities until an update condition for at least one of the state changes is not met.

Figure 8D:
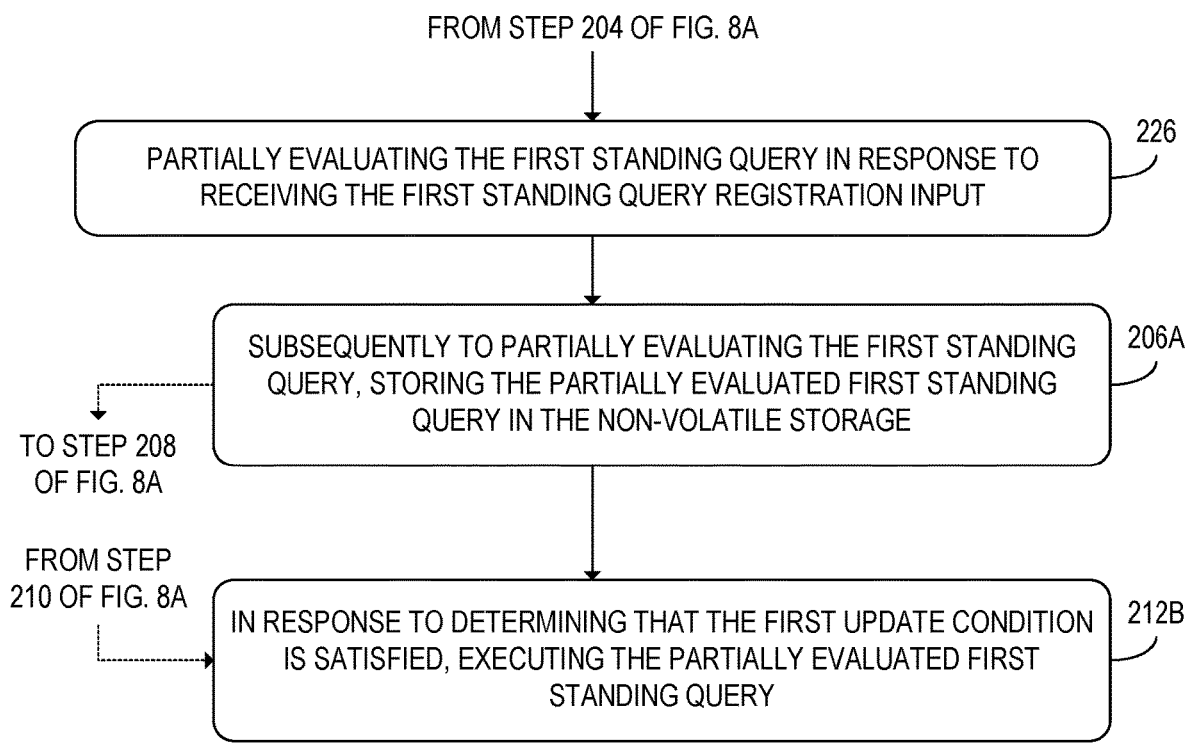

FIG. 8D shows additional steps of the method 200 that may be performed in some examples. Step 226 of the method 200 may be performed subsequently to receiving the first standing query registration input at step 204. At step 226, the method 200 may further include partially evaluating the first standing query in response to receiving the first standing query registration input. The first standing query may be partially evaluated at least in part by inputting one or more partial evaluation inputs into the first standing query. The one or more partial evaluation inputs may, in some examples, be read from the reactive database. At step 206A, in examples in which step 226 is performed, storing the first standing query in the non-volatile storage at step 206 may include storing the partially evaluated first standing query in the non-volatile storage subsequently to partially evaluating the first standing query.

In examples in which steps 226 and 206A are performed, the method 200 may further include performing step 212B when the first standing query is executed at step 212. At step 212B, the method 200 may further include executing the partially evaluated first standing query in response to determining that the first update condition is satisfied.

In examples in which the steps shown in FIG. 8B are performed, the second standing query may be partially evaluated. The partially evaluated second standing query may be stored in the non-volatile storage and may be executed in response to determining that the second update condition is satisfied. In examples in which three or more standing queries are stored in the non-volatile memory, partial evaluation may additionally or alternatively be performed for one or more other standing queries.

An example use case scenario for the systems and methods discussed above is now provided. In this example use case scenario, the reactive database is a digital twin model of an IoT-enabled building. At the reactive database API, the processor receives a first standing query registration input for a first standing query associated with a database entity representing a fire alarm. The first standing query has a first update condition that occurs when a temperature measured in a room of the building, as written to a database entity of the reactive database that represents a temperature detected by a temperature sensor, is above a predetermined threshold. When a temperature above the predetermined threshold is written to the database entity, the processor executes the first standing query to activate a fire alarm. In addition, when the first standing query is executed, a second standing query is executed to block access to all unoccupied elevators in the building.

Using the systems and methods discussed above, a database may be updated when specified conditions are satisfied without having to perform repeated polling queries to the database at a predetermined time interval. Computational resources may be saved by avoiding having to perform large numbers of polling queries. In addition, when an update condition is satisfied, the database may be updated without having to wait for a next polling query to be performed. Thus, updates to the database may be made with reduced latency compared to conventional database updating methods.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
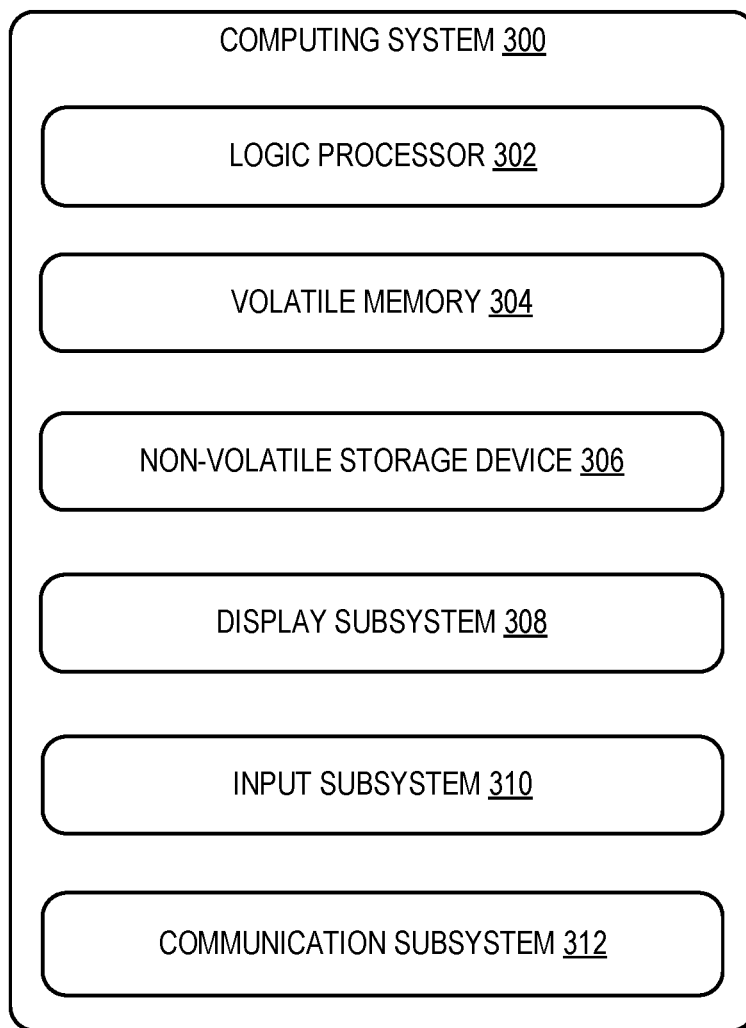
FIG. 9 shows a schematic view of an example computing environment in which the example computing systems of FIGS. 1A and 1B may be enacted.

FIG. 9 schematically shows a non-limiting embodiment of a computing system 300 that can enact one or more of the methods and processes described above. Computing system 300 is shown in simplified form. Computing system 300 may embody the distributed database computing system 10 described above and illustrated in FIG. 1A or the distributed database computing system 10A described above and illustrated in FIG. 1B. Components of computing system 300 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry.

Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing system is provided, including non-volatile storage storing a reactive database including a plurality of database entities. The computing system may further include a processor configured to, via a reactive database application program interface (API), receive a first standing query registration input including a first standing query. The first standing query may include a first update condition and may be associated with a first database entity of the plurality of database entities. The processor may be further configured to store the first standing query in the non-volatile storage. The processor may be further configured to write data to the reactive database. The processor may be further configured to determine that the first update condition is satisfied by the written data. In response to determining that the first update condition is satisfied, the processor may be further configured to execute the first standing query to perform a first state change at the first database entity of the plurality of database entities.

According to this aspect, the processor may be configured to generate a graph representation of the reactive database. In the graph representation, the plurality of database entities may be represented as a plurality of database nodes connected by a plurality of edges.

According to this aspect, the processor may be further configured to generate a binary large object (blob) representation of the reactive database from a relational representation of the reactive database. The reactive database may be stored in the non-volatile storage in the blob representation. The processor may be further configured to generate the graph representation of the reactive database from the blob representation.

According to this aspect, the processor may be further configured to write the written data to the relational representation of the reactive database. The processor may be further configured to update the blob representation stored in the non-volatile storage based at least in part on the written data. The processor may be further configured to update the graph representation based at least in part on the updated blob representation. The processor may be further configured to determine that the first update condition is satisfied by the written data at the graph representation of the reactive database.

According to this aspect, the processor may be further configured to, via the reactive database API, receive a second standing query registration input including a second standing query. The second standing query may include a second update condition. The second update condition may include the first state change. The second standing query may be associated with a second database entity of the plurality of database entities that is connected to the first database entity by an edge of the plurality of edges. The processor may be further configured to store the second standing query in the non-volatile storage. In response to performing the first state change, the processor may be further configured to determine that the second update condition is satisfied. In response to determining that the second update condition is satisfied, the processor may be further configured to execute the second standing query to perform a second state change at the second database entity.

According to this aspect, the plurality of database entities and edges of the graph representation of the reactive database may have a graph structure with at least one cycle. In response to determining that the first update condition is satisfied, the processor may be configured to perform a plurality of state changes, including the first state change and the second state change, in a state change sequence that includes one or more iterations through the at least one cycle of the graph structure.

According to this aspect, the reactive database may be a digital twin model in which the plurality of database entities and the plurality of edges are configured to model a physical system.

According to this aspect, the processor may be further configured to: partially evaluate the first standing query in response to receiving the first standing query registration input. Subsequently to partially evaluating the first standing query, the processor may be further configured to store the partially evaluated first standing query in the non-volatile storage. In response to determining that the first update condition is satisfied, the processor may be further configured to execute the partially evaluated first standing query.

According to this aspect, the non-volatile storage may be distributed between a plurality of physical non-volatile storage devices. The written data may be written to the reactive database and the first state change may be performed at the first database entity in respective quorum committed writes to the physical non-volatile storage devices.

According to this aspect, the first state change may be a change to one or more values stored in the reactive database and/or to an architecture of the reactive database.

According to this aspect, the first state change may include generating an additional standing query associated with the first database entity and storing the additional standing query in the non-volatile storage.

According to this aspect, the first standing query may be associated with two or more database entities including the first database entity. Executing the first standing query may include performing two or more respective state changes, including the first state change, at the two or more database entities.

According to another aspect of the present disclosure, a method for use with a computing system is provided. The method may include storing, in non-volatile storage, a reactive database including a plurality of database entities. The method may further include, via a reactive database application program interface (API), receiving a first standing query registration input including a first standing query. The first standing query may include a first update condition and may be associated with a first database entity of the plurality of database entities. The method may further include storing the first standing query in the non-volatile storage. The method may further include writing data to the reactive database. The method may further include determining that the first update condition is satisfied by the written data. In response to determining that the first update condition is satisfied, the method may further include executing the first standing query to perform a first state change at the first database entity of the plurality of database entities.

According to this aspect, the method may further include generating a graph representation of the reactive database. In the graph representation, the plurality of database entities may be represented as a plurality of database nodes connected by a plurality of edges.

According to this aspect, the method may further include generating a binary large object (blob) representation of the reactive database from a relational representation of the reactive database. The reactive database may be stored in the non-volatile storage in the blob representation. The method may further include generating the graph representation of the reactive database from the blob representation.

According to this aspect, the method may further include writing the written data to the relational representation of the reactive database. The method may further include updating the blob representation stored in the non-volatile storage based at least in part on the written data. The method may further include updating the graph representation based at least in part on the updated blob representation. The method may further include determining that the first update condition is satisfied by the written data at the graph representation of the reactive database.

According to this aspect, the method may further include, via the reactive database API, receiving a second standing query registration input including a second standing query. The second standing query may include a second update condition. The second update condition may include the first state change. The second standing query may be associated with a second database entity of the plurality of database entities that is connected to the first database entity by an edge of the plurality of edges. The method may further include storing the second standing query in the non-volatile storage. In response to performing the first state change, the method may further include determining that the second update condition is satisfied. In response to determining that the second update condition is satisfied, the method may further include executing the second standing query to perform a second state change at the second database entity.

According to this aspect, the plurality of database entities and edges of the graph representation of the reactive database may have a graph structure with at least one cycle. In response to determining that the first update condition is satisfied, the method may further include performing a plurality of state changes, including the first state change and the second state change, in a state change sequence that includes one or more iterations through the at least one cycle of the graph structure.

According to this aspect, the method may further include partially evaluating the first standing query in response to receiving the first standing query registration input. Subsequently to partially evaluating the first standing query, the method may further include storing the partially evaluated first standing query in the non-volatile storage. In response to determining that the first update condition is satisfied, the method may further include executing the partially evaluated first standing query.

According to another aspect of the present disclosure, a computing system is provided, including a processor configured to generate a binary large object (blob) representation of a reactive database from a relational representation of the reactive database. The processor may be further configured to store the reactive database in non-volatile storage in the blob representation. The processor may be further configured to generate a graph representation of the reactive database from the blob representation. Via a reactive database application program interface (API), the processor may be further configured to receive a first standing query registration input including a first standing query. The first standing query may include a first update condition and may be associated with a first database entity of the plurality of database entities. The processor may be further configured to store the first standing query in the non-volatile storage. Via the reactive database API, the processor may be further configured to receive a second standing query registration input including a second standing query. The second standing query may include a second update condition. The second update condition may include the first state change. The second standing query may be associated with a second database entity of the plurality of database entities that may be connected to the first database entity by an edge of the plurality of edges in the graph representation of the reactive database. The processor may be further configured to store the second standing query in the non-volatile storage. The processor may be further configured to write data to the relational representation of the reactive database. The processor may be further configured to update the blob representation stored in the non-volatile storage based at least in part on the written data. The processor may be further configured to update the graph representation based at least in part on the updated blob representation. The processor may be further configured to determine that the first update condition is satisfied by the written data at the graph representation of the reactive database. In response to determining that the first update condition is satisfied, the processor may be further configured to execute the first standing query to perform a first state change at the first database entity of the plurality of database entities. In response to performing the first state change, the processor may be further configured to determine that the second update condition is satisfied. In response to determining that the second update condition is satisfied, the processor may be further configured to execute the second standing query to perform a second state change at the second database entity.

"And/or" as used herein is defined as the inclusive or ∨, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
generate a binary large object (blob) representation of a reactive database from a relational representation of the reactive database;
store the reactive database in the blob representation, in non-volatile storage;
generate a graph representation of the reactive database from the blob representation, wherein the graph representation is a graph database in which a plurality of database entities are represented as a plurality of database nodes connected by a plurality of edges;
via a reactive database application program interface (API), receive a first standing query registration input including a first standing query, wherein:
the first standing query includes a first update condition and is associated with a first database entity of the plurality of database entities; and
the first update condition is a condition on one or more respective values of one or more of the database entities or on a structural property of the reactive database;
in response to receiving the first standing query registration input, partially evaluate the first standing query on one or more partial evaluation inputs that are stored in the reactive database and form a proper subset of a plurality of inputs of the first standing query, wherein:
the one or more partial evaluation inputs are received at the processor as one or more query responses; and
one or more remaining inputs of the first standing query are left unfilled when the first standing query is partially evaluated;
subsequently to partially evaluating the first standing query, store the first standing query in the non-volatile storage;
write data to the relational representation of the reactive database;
update the blob representation stored in the non-volatile storage based at least in part on the written data;
update the graph representation based at least in part on the updated blob representation;
determine that the first update condition is satisfied by the written data at the graph representation of the reactive database; and
in response to determining that the first update condition is satisfied, execute the partially evaluated first standing query on the remaining inputs of the first standing query to perform a first state change at the first database entity of the plurality of database entities, wherein the first state change is a change to one or more values stored in the reactive database and/or to an architecture of the reactive database.

2. The computing system of claim 1, wherein the processor is further configured to:
via the reactive database API, receive a second standing query registration input including a second standing query, wherein:
the second standing query includes a second update condition;
the second update condition includes the first state change; and
the second standing query is associated with a second database entity of the plurality of database entities that is connected to the first database entity by an edge of the plurality of edges;
store the second standing query in the non-volatile storage;
in response to performing the first state change, determine that the second update condition is satisfied; and
in response to determining that the second update condition is satisfied, execute the second standing query to perform a second state change at the second database entity.

3. The computing system of claim 2, wherein:
the plurality of database entities and edges of the graph representation of the reactive database have a graph structure with at least one cycle; and
in response to determining that the first update condition is satisfied, the processor is configured to perform a plurality of state changes, including the first state change and the second state change, in a state change sequence that includes one or more iterations through the at least one cycle of the graph structure.

4. The computing system of claim 1, wherein the reactive database is a digital twin model in which the plurality of database entities and the plurality of edges are configured to model a physical system.

5. The computing system of claim 1, wherein:
the non-volatile storage is distributed between a plurality of physical non-volatile storage devices; and
the written data is written to the reactive database and the first state change is performed at the first database entity in respective quorum committed writes to the physical non-volatile storage devices in which a plurality of physical processors associated with the physical non-volatile storage devices are configured to:
cast transaction votes on whether to commit transactions to write the written data to the reactive database; and
commit the transactions to write the written data to the reactive database in response to determining that a number of the physical processors greater than or equal to a predefined number vote to commit the transaction.

6. The computing system of claim 1, wherein the first state change includes generating an additional standing query associated with the first database entity and storing the additional standing query in the non-volatile storage.

7. The computing system of claim 1, wherein:
the first standing query is associated with two or more database entities including the first database entity; and
executing the first standing query includes performing two or more respective state changes, including the first state change, at the two or more database entities.

8. A method for use with a computing system, the method comprising:
generating a binary large object (blob) representation of a reactive database from a relational representation of the reactive database;
storing the reactive database in non-volatile storage in the blob representation;
generating a graph representation of the reactive database from the blob representation, wherein the graph representation is a graph database in which a plurality of database entities are represented as a plurality of database nodes connected by a plurality of edges;

via a reactive database application program interface (API), receiving a first standing query registration input including a first standing query, wherein:
  the first standing query includes a first update condition and is associated with a first database entity of the plurality of database entities; and
  the first update condition is a condition on one or more respective values of one or more of the database entities or on a structural property of the reactive database;

in response to receiving the first standing query registration input, partially evaluating the first standing query on one or more partial evaluation inputs that are stored in the reactive database and form a proper subset of a plurality of inputs of the first standing query, wherein:
  the one or more partial evaluation inputs are received as one or more query responses; and
  one or more remaining inputs of the first standing query are left unfilled when the first standing query is partially evaluated;

subsequently to partially evaluating the first standing query, storing the first standing query in the non-volatile storage;

writing data to the relational representation of the reactive database;

updating the blob representation stored in the non-volatile storage based at least in part on the written data;

updating the graph representation based at least in part on the updated blob representation;

determining that the first update condition is satisfied by the written data at the graph representation of the reactive database; and in response to determining that the first update condition is satisfied, executing the partially evaluated first standing query on the remaining inputs of the first standing query to perform a first state change at the first database entity of the plurality of database entities, wherein the first state change is a change to one or more values stored in the reactive database and/or to an architecture of the reactive database.

9. The method of claim 8, further comprising:

via the reactive database API, receiving a second standing query registration input including a second standing query, wherein:
  the second standing query includes a second update condition;
  the second update condition includes the first state change; and
  the second standing query is associated with a second database entity of the plurality of database entities that is connected to the first database entity by an edge of the plurality of edges;

storing the second standing query in the non-volatile storage;

in response to performing the first state change, determining that the second update condition is satisfied; and in response to determining that the second update condition is satisfied, executing the second standing query to perform a second state change at the second database entity.

10. The method of claim 9, wherein:

the plurality of database entities and edges of the graph representation of the reactive database have a graph structure with at least one cycle; and in response to determining that the first update condition is satisfied, the method further includes performing a plurality of state changes, including the first state change and the second state change, in a state change sequence that includes one or more iterations through the at least one cycle of the graph structure.

* * * * *